United States Patent [19]

Park

[11] Patent Number: 5,443,883
[45] Date of Patent: Aug. 22, 1995

[54] BALLISTIC PANEL

[76] Inventor: Andrew D. Park, 2851 E. Brigstock Rd., Midlothian, Va. 23113

[21] Appl. No.: 327,310

[22] Filed: Oct. 21, 1994

Related U.S. Application Data

[62] Division of Ser. No. 243,976, May 17, 1994.

[51] Int. Cl.$^6$ .................. F41H 1/02; F41H 1/04; B32B 5/00
[52] U.S. Cl. .................. 428/103; 428/101; 428/911; 428/246; 428/408; 2/2.5; 2/5
[58] Field of Search .......... 428/103, 103, 911, 246, 428/408; 2/2.5

[56] References Cited

U.S. PATENT DOCUMENTS

| | | | |
|---|---|---|---|
| 3,322,613 | 5/1967 | Rasmussen | 161/234 |
| 3,439,865 | 4/1969 | Port et al. | 229/53 |
| 3,719,545 | 3/1973 | Lawler | 161/50 |
| 3,891,996 | 7/1975 | Leach et al. | 2/2.5 |
| 4,079,161 | 3/1978 | Kile | 428/220 |
| 4,090,005 | 5/1978 | Morgan | 428/251 |
| 4,181,768 | 1/1980 | Severin | 428/252 |
| 4,186,648 | 2/1980 | Clausen et al. | 89/36 A |
| 4,213,812 | 7/1980 | Boultinghouse | 156/226 |
| 4,287,607 | 9/1981 | Leach | 2/2.5 |
| 4,309,487 | 1/1982 | Holmes | 428/516 |
| 4,428,998 | 1/1984 | Hawlinson | 428/240 |
| 4,510,200 | 4/1985 | Samowich | 428/252 |
| 4,574,105 | 3/1986 | Donovan | 428/233 |
| 4,613,535 | 9/1986 | Harpell et al. | 428/113 |
| 4,623,574 | 11/1986 | Harpell et al. | 428/113 |
| 4,650,710 | 3/1987 | Harpell et al. | 428/263 |
| 4,678,702 | 7/1987 | Lancaster et al. | 428/252 |
| 4,681,792 | 7/1987 | Harpell et al. | 428/102 |
| 4,737,401 | 4/1988 | Harpell et al. | 428/252 |
| 4,739,690 | 4/1988 | Moskowitz | 89/36.02 |
| 4,748,064 | 5/1988 | Harpell et al. | 428/113 |
| 4,879,165 | 11/1989 | Smith | 428/212 |
| 4,916,000 | 4/1990 | Li et al. | 428/105 |
| 4,953,234 | 9/1990 | Li et al. | 428/113 |
| 5,179,244 | 1/1993 | Zufle | 89/36.02 |
| 5,180,880 | 1/1993 | Zufle | 89/36.02 |

OTHER PUBLICATIONS

Safety & Protective Fabrics, May 1993, all pages.
Congress of the United States Office of Technology Assessment, "Police Body Armor Standards and Testing," vol. 1, all pages.
Nonwovens Industry, Apr. 1991, pp. 28, 29 and 30.

Primary Examiner—Patrick J. Ryan
Assistant Examiner—Richard Weisberger
Attorney, Agent, or Firm—W. Thad Adams, III

[57] ABSTRACT

A ballistic laminate structure in sheet form, which includes a first array of high performance, unidirectionally-oriented fiber bundles and a second array of high performance, unidirectionally-oriented fiber bundles cross-plied at an angle with respect to the first array of fiber bundles, and laminated to the first array of fiber bundles in the absence of adhesives or bonding agents. First and second thermoplastic films are bonded to outer surfaces of the laminated first and second arrays of unidirectional fiber bundles without penetration of the films into fiber bundles or through the laminate from one side to the other.

12 Claims, 8 Drawing Sheets

BALLISTIC PANEL

This application is a divisional of application Ser. No. 08/243,976, filed on May 17, 1994.

TECHNICAL FIELD AND BACKGROUND OF THE INVENTION

This invention relates to a ballistic laminate structure in sheet form, a ballistic panel constructed of a plurality of the sheets, a ballistic garment constructed of one or more of the ballistic panels, and a method of fabricating a ballistic laminate structure.

Numerous ballistic laminates are known, for example, those disclosed in U.S. Pat. Nos. 4,916,000, 4,079,161, 4,309,487, and 4,213,812. Prior art laminates have been constructed of numerous fibers, including polyethylene, polyolefin and aramid fibers. Many such prior art laminates are woven of various fibers, such as aramid fibers sold under the trademark "Kevlar".

A ballistic non-woven laminate referred to by the trademark Spectra-Shield is manufactured by Allied-Signal, Inc. The laminate structure is used in soft body armor to protect the wearer against high-velocity bullets and fragments. Spectra-Shield is made by first forming a non-woven unidirectional tape, composed of unidirectional polyethylene fibers and an elastic resin material that holds the fibers together. The resin penetrates to the filament level, impregnating the entire structure with the resin product. Two layers, or arrays, of the unidirectional tape are then laminated together (cross-plied) at right angles to form a panel. Then, the panel is covered on both sides with a thin film of polyethylene on the order of 0.001 inches thick. The film prevents adjacent panels from sticking together when the panels are layered together in the soft body armor.

The present invention relates to an improved non-woven ballistic laminate structure. Enhanced anti-ballistic characteristics are obtained while optimizing use of materials in the laminate. Specifically, it has been determined that ballistic laminates can be constructed of high performance fibers without using resins to hold the fibers together. This substantially reduces the weight of the structure without compromising the anti-ballistic characteristics of the structure. As used in this application, the term "high performance fiber" refers to fibers having a tensile strength greater than 7 grams per denier.

By omitting the resin, the cross-plied arrays of fibers directly contact each other, instead of being encapsulated and therefore separated from each other by the resin. An ultra-thin film is used both to cover the cross-plied arrays and to hold the arrays to each other.

The prior art teaches that a critical limit of 80% fiber must be maintained in the laminate in order to maintain product integrity. If the percentage of resin, covers and the like exceeds 20%, the anti-ballistic qualities of the laminate begin to degrade.

This invention incorporates certain features heretofore recognized as being only applicable to older, low performance fibers into the field of high performance fibers in order to achieve a ballistic laminate structure with enhanced anti-ballistic characteristics.

SUMMARY OF THE INVENTION

Therefore, it is an object of the invention to provide a ballistic laminate structure in sheet form, which includes a first array of high performance, unidirectionally-oriented fiber bundles and a second array of high performance, unidirectionally-oriented fiber bundles cross-plied at an angle with respect to the first array of fiber bundles, and laminated to the first array of fiber bundles in the absence of adhesives or bonding agents. First and second thermoplastic films are bonded to outer surfaces of the laminated first and second arrays of unidirectional fiber bundles without penetration of the films into fiber bundles or through the laminate from one side to the other.

According to one preferred embodiment of the invention, the high-performance fiber is chosen from the group consisting of aramid fiber, ultra high molecular weight polyethylene, high molecular weight polyethylene, high modulus vinylon, and liquid crystal polymer-based fiber.

According to another preferred embodiment of the invention, the first array of fiber bundles is cross-plied at an angle of 90 degrees to the second array of fiber bundles.

According to yet another preferred embodiment of the invention, the first and second thermoplastic films comprise polyethylene film having a thickness of 0.35 mils.

According to yet another preferred embodiment of the invention, the percentage by weight of the high performance fibers in the ballistic laminate structure is at least 80 percent of the total weight of the ballistic laminate structure.

According to yet another preferred embodiment of the invention, a ballistic laminate structure is provided, and includes a first array of high performance, unidirectionally-oriented aramid fiber bundles and a second array of high performance, unidirectionally-oriented aramid fiber bundles cross-plied at right angles with respect to the first array of fiber bundles, and laminated to the first array of fiber bundles in the absence of adhesives or bonding agents. First and second polyethylene films, each film having a thickness of 0.35 mils, are bonded to the outer surfaces of the laminated first and second arrays of unidirectional fibers without penetration of the films into fiber bundles or through the laminate from one sheet of fibers to the other.

According to yet another preferred embodiment of the invention, each of the aramid fiber arrays has 10 bundles per inch of 840 denier, 1.5 denier per filament fiber.

A ballistic panel is constructed of ballistic laminate structures according to the invention. A panel for preventing penetration of hand gun rounds contains at least 10 sheets of the ballistic laminate structure.

A ballistic panel for preventing penetration of high velocity rifle rounds contains at least 40 sheets of the ballistic laminate structure.

According to yet another preferred embodiment of the invention, the ballistic panel includes a fabric envelope within which the ballistic laminate structure sheets are contained.

An armored garment according to the present invention includes at least one ballistic panel according to the invention contained within a supporting structure for being worn on a body part.

According to yet another preferred embodiment of the invention, the armored garment includes a panel for preventing penetration of hand gun rounds, and contains at least 10 and no more than 60 sheets of the ballistic laminate structure.

According to yet another preferred embodiment of the invention, the armored garment includes a panel for preventing penetration of high velocity rifle rounds containing at least 40 and no more than 150 sheets of the ballistic laminate structure.

According to yet another preferred embodiment of the invention, the armored garment includes a fabric envelope within which the ballistic laminate structure sheets are contained.

An embodiment of the method of fabricating a ballistic laminate structure in sheet form according to the invention comprises the steps of forming a first array of high performance, unidirectionally-oriented fiber bundles, forming a second array of high performance, unidirectionally-oriented fiber bundles, and cross-plying the second array of fiber bundles at an angle with respect to the first array of fiber bundles. Films are bonded to respective opposing outer surfaces of the laminated first and second arrays of unidirectional fiber bundles without penetration of the films into fiber bundles or through the laminate from one side of the ballistic laminate structure to the other.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
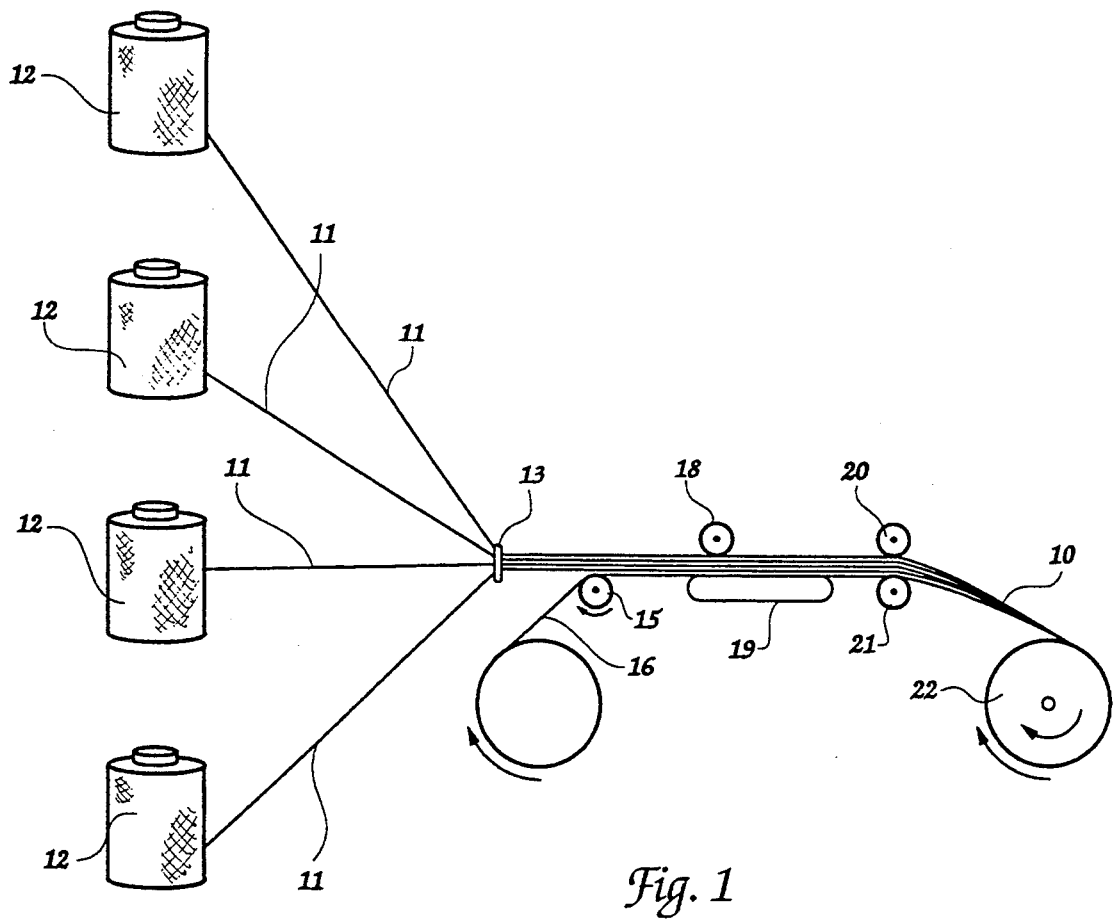
FIG. 1 is a simplified flow diagram of the process of fabricating the ballistic laminate in sheet form according to a preferred embodiment of the invention.

Referring now specifically to the drawings, a ballistic laminate structure in sheet form according to the present invention is illustrated in FIG. 1 and shown generally at reference numeral 10. The sheet 10 is created according to the process illustrated in FIG. 1. A plurality of bundles 11 of untwisted high performance fibers are formed into an array. The bundles 11 may be supplied from separate creeled yarn packages 12, as shown in FIG. 1, or may be supplied from a warp beam (not shown). The fibers in the bundles 11 are unidirectional, and the bundles are passed through a comb guide 13 where the fiber bundles 11 are further parallelized and formed into an array having a predetermined uniform number of bundles per inch of width. A single layer of fiber bundles 11 are arrayed and then passed over a film application roller 15 where a thin polyethylene film 16 is applied to one side of the array of fiber bundles 11. A pre-lamination roller 18 presses the array of fiber bundles 11 onto the film 16, which is supported on a heated platen 19. After heating, the fiber bundles and the attached film 16 are laminated by passing them through a pair of heated nip rolls 20, 21. The assembled laminate structure is then wound onto a take-up beam 22.

Figure 2:
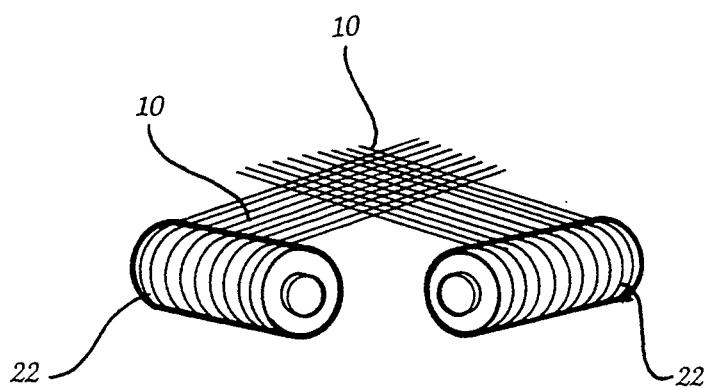
FIG. 2 illustrates formation of the laminate structure from two identical laminate sheets.
Figure 3:
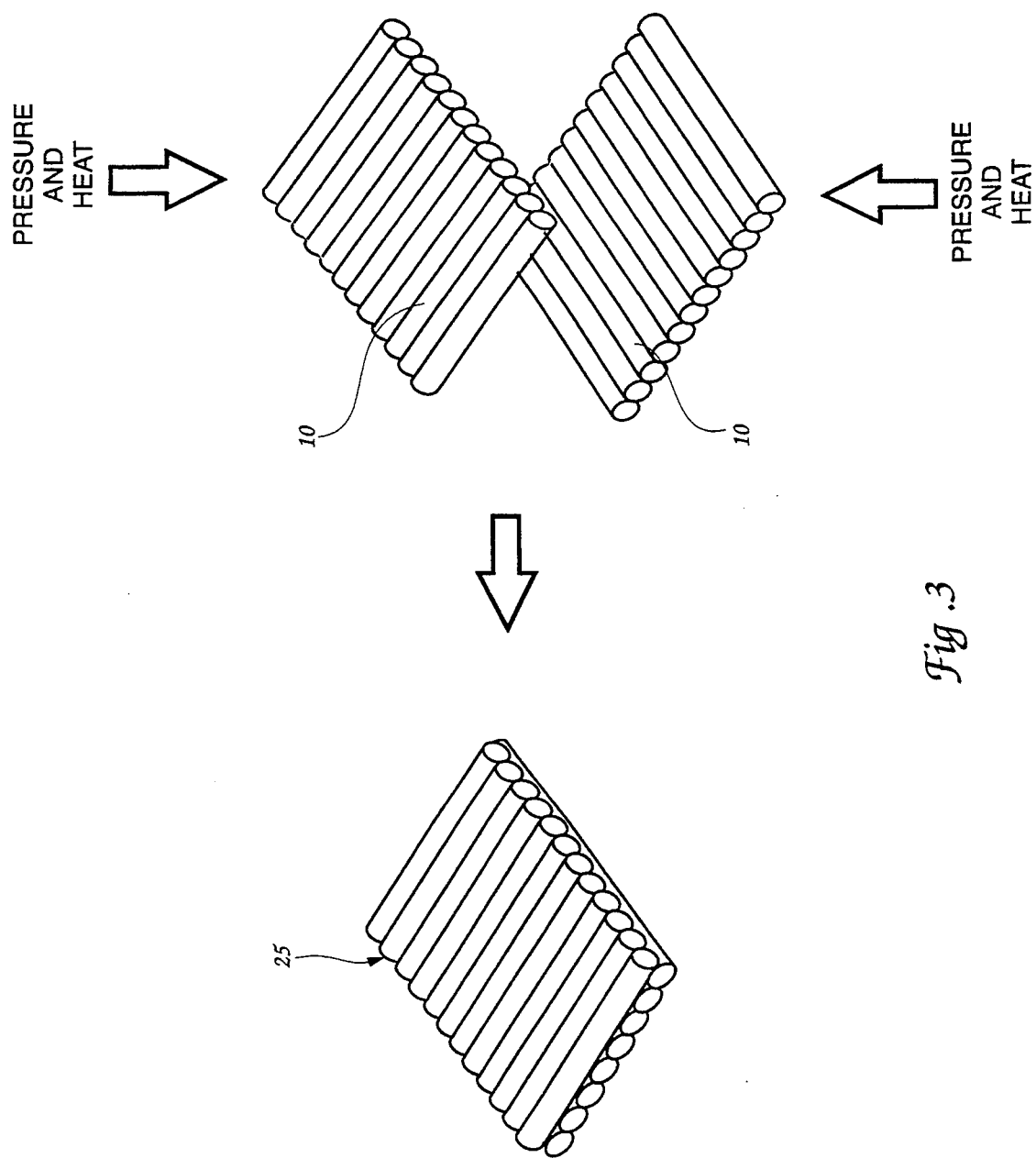
FIG. 3 further illustrates formation of the laminate structure from two identical laminate sheets.

Referring now to FIG. 2, two layers, or plies, of the sheet 10 are bonded to each other with the direction of the fiber bundles at 90 degree angles to each other. Other cross ply angles are possible, such as 45°. The sheets 10 are layered with the respective polyethylene films 16 on the outside, so that substantially uncoated high performance fibers are in contact with each other. As is illustrated in FIG. 3, the bonding occurs by further heating of the sheets 10 so that the films 16 remelt. The films 16 are extremely thin, on the order of 0.35 mils, so that the films 16 will slightly coat the exterior surfaces of the individual fiber bundles 11, but will not penetrate into the fiber bundles 11 so to coat and encapsulate the individual fibers and filaments. Sufficient plasticized film material 16 flows between the adjacent cross-plied arrays of fiber bundles 11 to bond the two fiber bundles 11 together to form a ballistic laminate structure 25.

Figure 4:
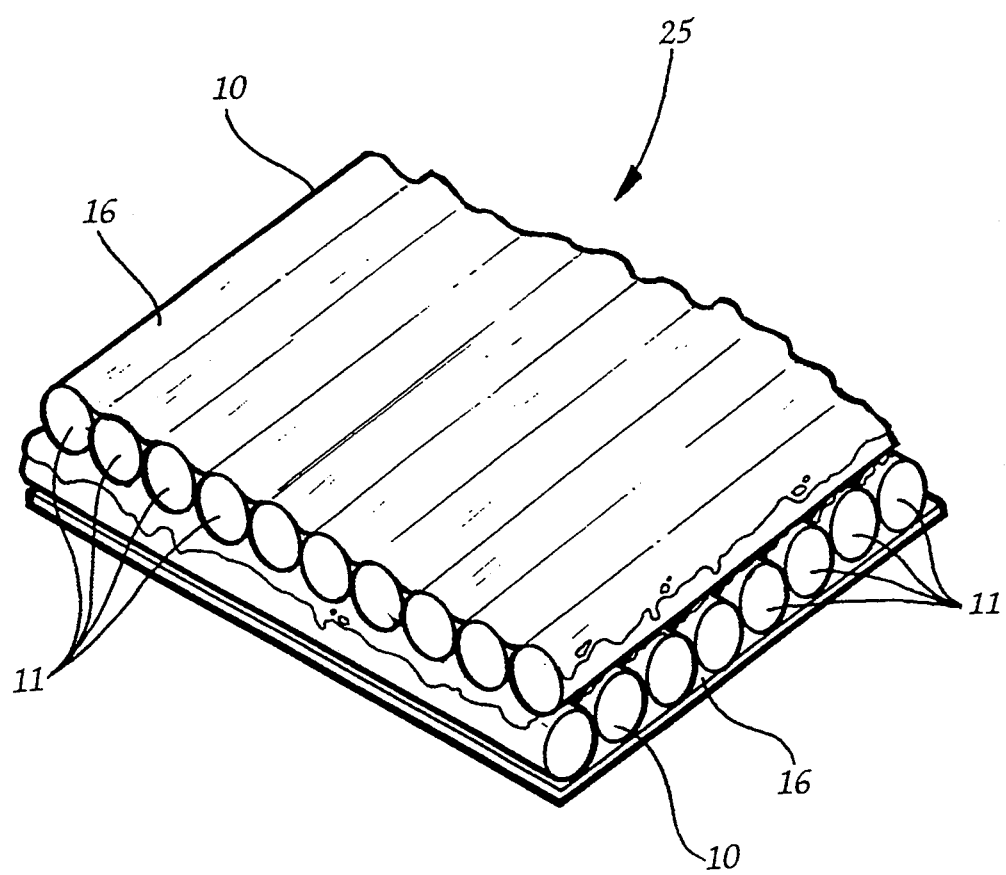
FIG. 4 is an enlarged, diagrammatic representation of the interaction of the thin covering films and the unidirectional fiber arrays of the laminate structure.

As is shown in FIG. 4, the fiber bundles 11 of each of the sheets 10 are at right angles to each other. The outer surface of each of the sheets 10 are coated with the film 16. As is illustrated, the film 16 has melted and flowed into the interstices between the fiber bundles 11 of each of the sheets 10. Sufficient melted polyethylene from both of the films 16 have intermingled with each other and coated the outer surface of the fiber bundles of the other sheet 10 to create a surface bond with hold the two sheets 10 together to form the laminate structure 25.

Figure 5:
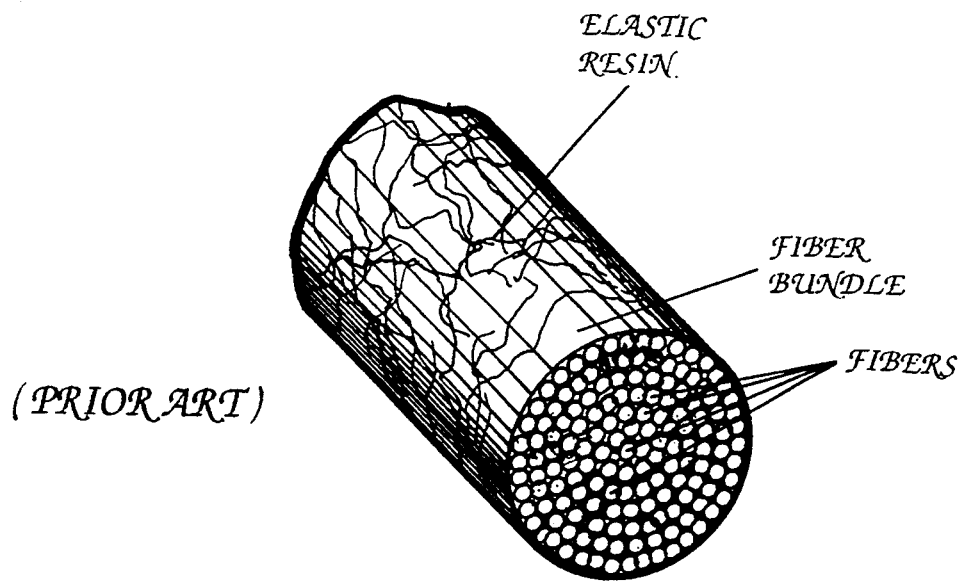
FIG. 5 is an enlarged view of a single fiber bundle according to the prior art, showing complete impregnation of the resin into the structure of the fiber bundle.
Figure 6:
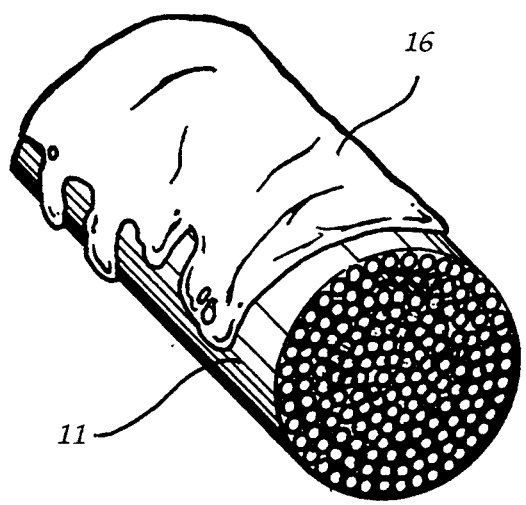
FIG. 6 is a enlarged view of a single fiber bundle according to an embodiment of the invention showing lack of impregnation of the resin into the structure of the fiber bundle.

This is illustrated more clearly in FIGS. 5 and 6. FIG. 5 shows a prior art construction such as a Spectra-Shield product using both an elastic resin and a surface film. The individual fiber bundles and the individual fibers which make up the bundle are substantially completely encapsulated with the elastic resin (the black, surrounding material) as well as the outside of the fiber bundle. This adds to the weight of the product and creates the possibility of variation in quality if too much or too little resin is used, or if the resin is applied unevenly or inconsistently.

In contrast, the fiber bundles 11 according to the present invention are coated by the film 16 on the outside surface only, so that the integral structure of parallel, closely bunched filaments and fibers remains intact, and intimate contact between the closely bunched filaments and fibers remains. The film 16 may not even coat the entire outer surface of the fiber bundle 11, but only to a sufficient degree to properly bond the two sheets 10 together to form the laminate structure 25. This is also illustrated in FIG. 4.

A preferred embodiment is given in the following example:

Fiber—Kevlar brand aramid fiber
Fiber construction—840 denier, 1.5 den/fil. per tow.
Sheet Construction—10 ends/inch unidirectional untwisted tows Number of Sheets in laminate structure—2
Sheet orientation of 1st and 2nd sheets—90 degrees
Film—0.35 mil polyethylene
Laminate structure—intimately plied sheets with overlying, surface-applied polyethylene film
Percentage of fiber weight to film weight—80%

Figure 7:
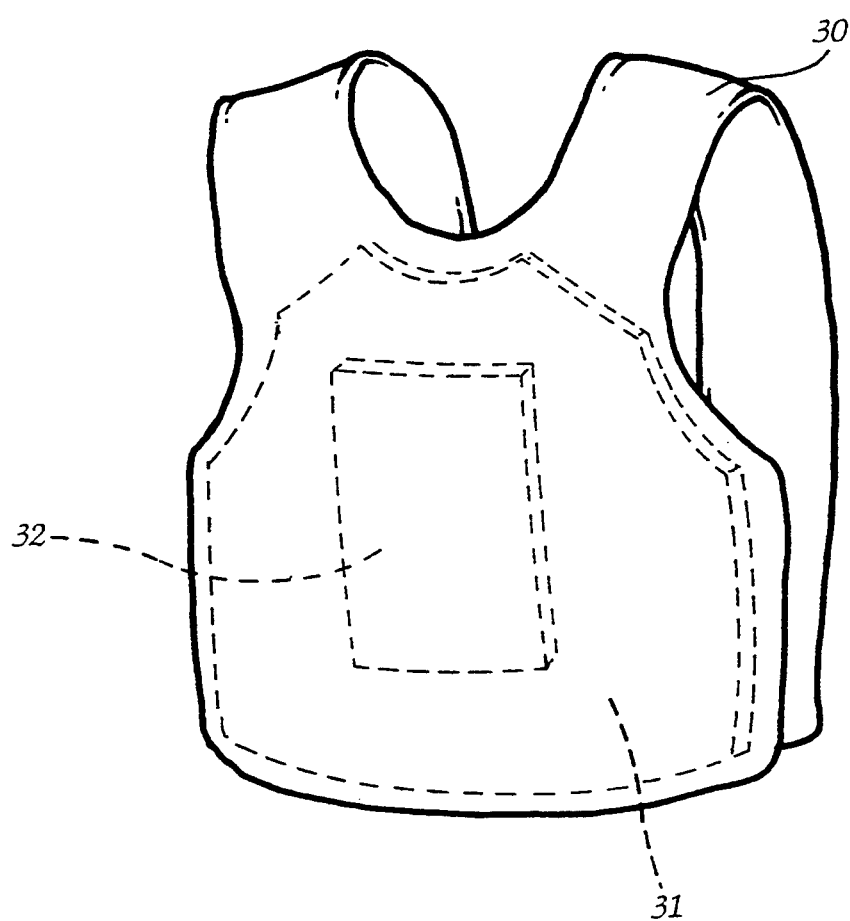
FIG. 7 is an armored body garment according to a preferred embodiment of the invention.

The laminate structure 25 must be used in multiple layers to form a ballistic panel for incorporation into a garment. Referring to FIG. 7, a ballistic garment 30 is illustrated. The garment 30 incorporates two protective ballistic panels. A first panel 31 is formed of multiple layers of laminate structures 25. A panel 31 for preventing penetration of conventional rifle rounds contains at least 10 and no more than 40 sheets of the ballistic laminate structure 25. A panel 31 for preventing penetration of hand gun rounds contains at least 40 and no more than 80 sheets of the ballistic laminate structure 25. Adequate protection from extremely high powered rifles or rifles firing steel core and/or steel jacketed rounds may require up to 150 layers. The laminate structures 25 are not bound together in any way, but are overlaid in substantial registration with each other and placed in an envelope or pocket formed in the garment 30.

As is shown in FIG. 7, the panel 31 is relatively large and covers substantially the entire thorax region of the wearer. A smaller panel 32, which may contain the same, a lesser, or a greater number of laminate structures 25, is placed over the larger panel 31 in a separate pocket or envelope and provides additional protection to vital organs such as the heart and lungs. The garment 30 is illustrative of many types of garments which can incorporate panels formed of layers of the laminate structure 25 disclosed in this application.

Figure 8:
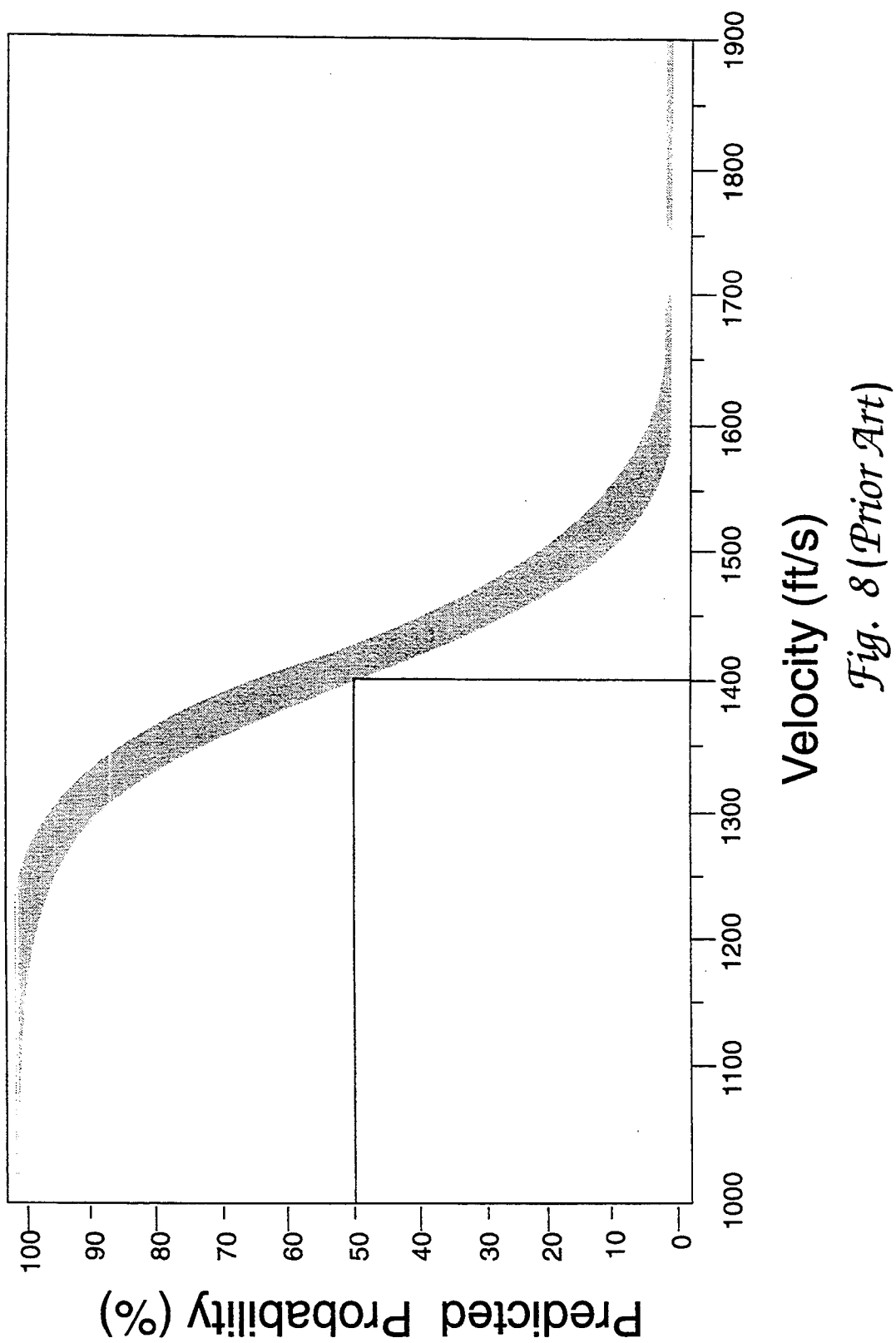
FIG. 8 is a table showing estimated stopping ability of a prior art aramid (Kevlar) fabric.

Referring now to FIG. 8, the graph illustrates that at the 50% predicted probability level, a standard measure of ballistic efficiency, a prior art fabric constructed of Kevlar 129 fiber will stop a 9 mm round of ammunition traveling at 1400 ft/sec.

Figure 9:
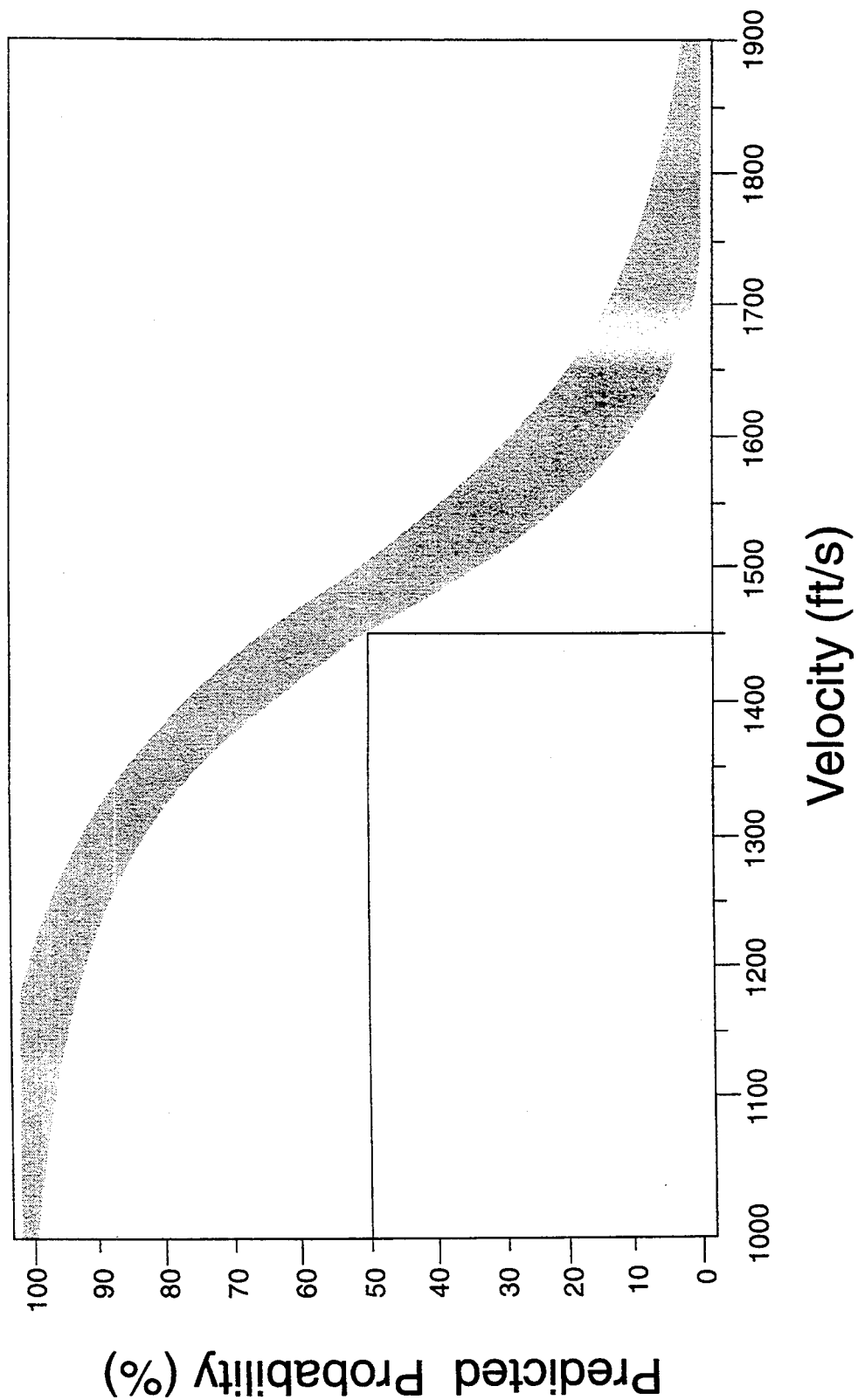
FIG. 9 is a table showing estimated stopping ability of a prior art Spectra-Shield polyethylene fabric.

Referring to FIG. 9, the graph illustrates that at the 50% predicted probability level a prior art Spectra Shield fabric will stop a 9 mm round of ammunition traveling at 1450 ft/sec.

Figure 10:
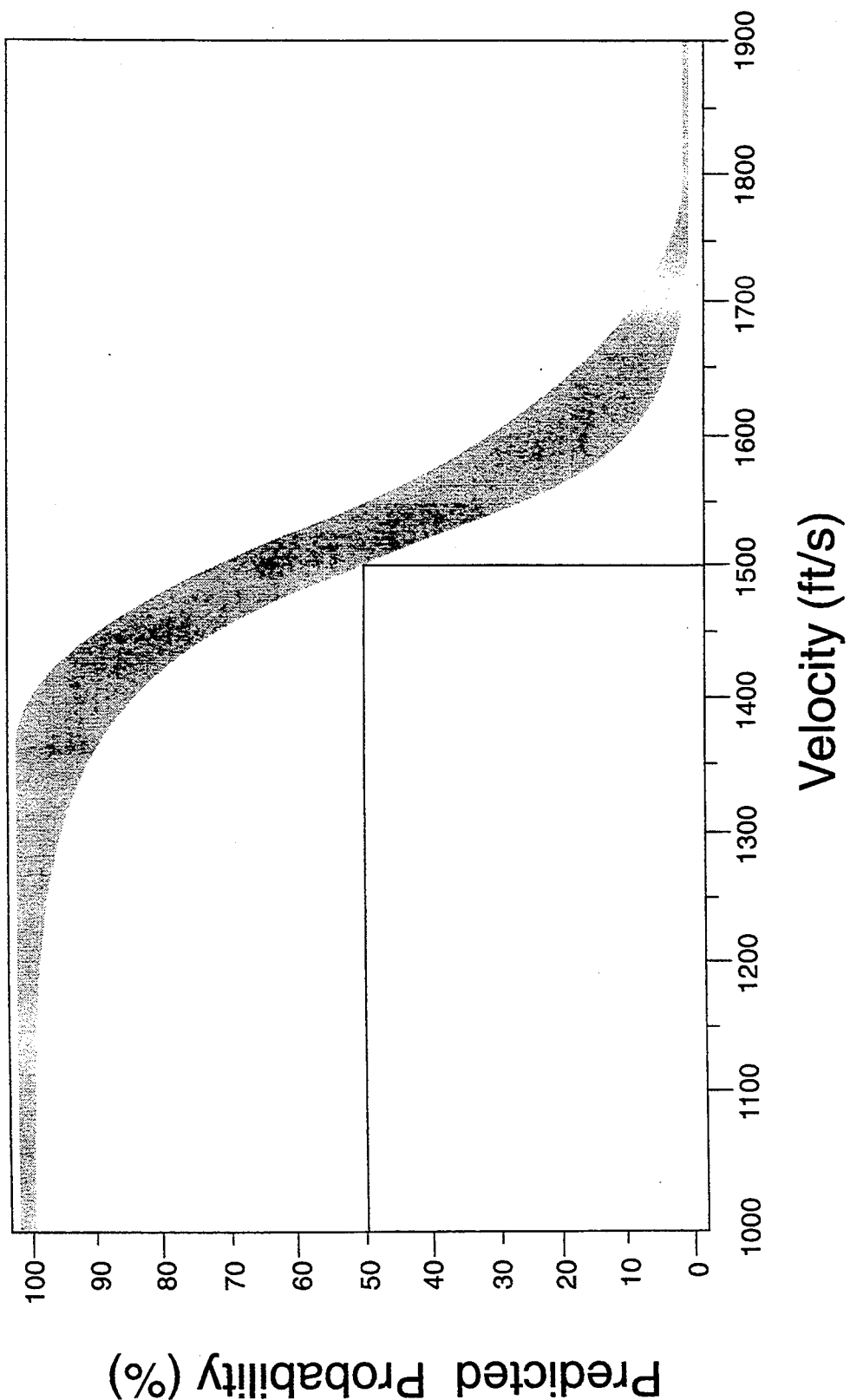
FIG. 10 is a table showing estimated stopping ability of a aramid fiber (Kevlar) laminate structure according to a preferred embodiment of the invention.

In contrast, as is shown in FIG. 10, a Kevlar panel constructed in accordance with an embodiment of the invention will stop a round of 9 mm ammunition traveling at 1500 ft/sec 50 percent of the time. Furthermore, the steeper slope of the graph indicates that at lower velocities, the probability of the round be stopped by the fabric is further improved over the prior art. In addition, the lighter weight of the inventive laminate structure 25, its relative ease of construction and assembly provide further advantages.

A high performance fiber laminate structure, ballistic panel, garment including a high performance ballistic panel and a method of constructing a high performance fiber laminate structure is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In a ballistic panel for preventing penetration of high-velocity bullets and fragments through the panel from one side to the other, the improvement comprising a plurality of ballistic laminate structure in sheet form assembled together to form the ballistic panel, said laminate structure comprising:
    (a) a first array of high performance, unidirectionally-oriented fiber bundles;
    (b) a second array of high performance, unidirectionally-oriented fiber bundles cross-plied at an angle with respect to said first array of fiber bundles, and laminated to said first array of fiber bundles in the absence of adhesives or bonding agents, said first and second arrays of high performance, unidirectionally-oriented fiber bundles comprising fibers chosen from the group consisting of aramid fiber, ultra high molecular weight polyethylene, high molecular weight polyethylene, high modulus vinylon, and liquid crystal polymer-based fiber; and
    (c) first and second thermoplastic films bonded to outer surfaces of said laminated first and second arrays of unidirectional fiber bundles without penetration of said films into said fiber bundles or through the laminate structure from one side to the other, whereby a sufficient amount of film resides between the laminated first and second arrays of unidirectional fiber bundles to adhere the first and second arrays of fiber bundles together to form the ballistic laminate structure.

2. An improved ballistic panel according to claim 1, wherein the first array of fiber bundles is cross-plied at an angle of 90 degrees to the second array of fiber bundles.

3. An improved ballistic panel according to claim 1, wherein said first and second thermoplastic films comprise polyethylene film having a thickness of 0.35 mils.

4. An improved ballistic panel according to claim 1, wherein the percentage by weight of the high performance fibers in the ballistic laminate structure is at least 80 percent of the total weight of the ballistic laminate structure.

5. An improved ballistic panel according to claim 1, and comprising at least 10 and no more than 60 sheets of the ballistic laminate structure for preventing penetration of hand gun rounds.

6. An improved ballistic panel according to claim 1, and comprising at least 40 and no more than 150 sheets of the ballistic laminate structure for preventing penetration of high velocity rifle rounds.

7. An improved ballistic panel according to claim 1, and including a fabric envelope within which the ballistic laminate structure sheets are contained.

8. In a ballistic panel for preventing penetration of high-velocity bullets and fragments through the panel from one side to the other, the improvement comprising a plurality of ballistic laminate structure in sheet form assembled together and contained in a fabric envelope to form the ballistic panel, said laminate structure comprising:
    (a) a first array of high performance, unidirectionally-oriented aramid fiber bundles;
    (b) a second array of high performance, unidirectionally-oriented aramid fiber bundles cross-plied at an angle of 90 degrees with respect to said first array of fiber bundles, and laminated to said first array of fiber bundles in the absence of adhesives or bonding agents, said first and second arrays of high performance, unidirectionally-oriented fiber bundles comprising fibers chosen from the group consisting of aramid fiber, ultra high molecular weight polyethylene, high molecular weight polyethylene, high modulus vinylon, and liquid crystal polymer-based fiber; and (c) first and second thermoplastic films bonded to outer surfaces of said laminated first and second arrays of unidirectional fiber bundles without penetration of said films into said fiber bundles or through the laminate structure from one side to the other, whereby a sufficient amount of film resides between the laminated first and second arrays of unidirectional fiber bundles to adhere the first and second arrays of fiber bundles together to form the ballistic laminate structure.

9. An improved ballistic panel according to claim 8, wherein said first and second thermoplastic films comprise polyethylene film having a thickness of 0.35 mils.

10. An improved ballistic panel according to claim 8, wherein the percentage by weight of the high performance fibers in the ballistic laminate structure is at least 80 percent of the total weight of the ballistic laminate structure.

11. An improved ballistic panel according to claim 8, and comprising at least 10 and no more than 60 sheets of the ballistic laminate structure for preventing penetration of hand gun rounds.

12. An improved ballistic panel according to claim 8, and comprising at least 40 and no more than 150 sheets of the ballistic laminate structure for preventing penetration of high velocity rifle rounds.

* * * * *